United States Patent [19]

Tawada et al.

[11] 4,368,284

[45] Jan. 11, 1983

[54] POLYVINYL CHLORIDE COMPOSITE MATERIAL

[75] Inventors: Yoshihisa Tawada, Takatsuki; Minoru Ushioda, Amagasaki; Tetsuro Yamamoto; Itaru Hatano, both of Kobe, all of Japan

[73] Assignee: Kanegafuchi Kagaku Kogyo Kabushiki Kaisha, Osaka, Japan

[21] Appl. No.: 104,810

[22] Filed: Dec. 18, 1979

[30] Foreign Application Priority Data

Dec. 19, 1978 [JP]  Japan ................................ 53-1508155
Dec. 21, 1978 [JP]  Japan ................................ 53-159065

[51] Int. Cl.³ .............................................. C08K 3/34
[52] U.S. Cl. ................................... 524/230; 524/241; 524/451; 524/521; 524/567
[58] Field of Search .................... 260/42.49; 524/241, 524/230, 451, 521, 567

[56] References Cited

U.S. PATENT DOCUMENTS

| | | | |
|---|---|---|---|
| 3,157,614 | 11/1964 | Fischer | 260/42.49 |
| 3,390,800 | 7/1968 | Simons | 260/42.49 |
| 3,502,611 | 3/1970 | Palmer et al. | 260/42.49 |
| 3,546,158 | 12/1970 | Champion et al. | 260/42.49 |
| 3,880,773 | 4/1975 | White et al. | 260/45.75 R |
| 3,899,473 | 8/1975 | Johansson | 260/42.49 |
| 3,919,159 | 11/1975 | Burns | 260/31.2 R |

FOREIGN PATENT DOCUMENTS 2330846  1/1975  Fed. Rep. of Germany .

OTHER PUBLICATIONS

*Chemical Abstracts*; vol. 82; 1975; 157950a. (Abstract of above cited German Publication).

*Primary Examiner*—Lewis T. Jacobs
*Attorney, Agent, or Firm*—Armstrong, Nikaido, Marmelstein & Kubovcik

[57] ABSTRACT

A composite material comprising polyvinyl chloride, talc and a polyamide and/or amide compound is disclosed. The talc used is comprised of 85% or more by weight of particles having a diameter of 10 microns or less. The polyamide used has a softening point of less than 200° C. The amide compound used is in preference alkylene bis-amide or methylolated aliphatic amide. The composite material contains up to 30 parts by weight of the polyamide or the amide compound per 100 parts by weight of the talc used. The disclosed polyvinyl chloride composite material has an improved impact strength and improved thermal stability.

6 Claims, No Drawings

POLYVINYL CHLORIDE COMPOSITE MATERIAL

BACKGROUND OF THE INVENTION

1. Field of the Invention

This invention relates to the field of composite materials. More particularly, this invention relates to composite materials comprised of polyvinyl chloride reinforced with talc of less than a certain particle size.

2. Description of the Prior Art

Recently, studies have been made on imparting sufficient mechanical strength or thermal resistance to a thermoplastic resin by compounding inorganic fillers. Some resins have been already put to a practical use through this process. Fiberglass has served as a reinforcing material for polyvinyl chloride. Of course, other reinforcing materials, such as asbestos, needle-like calcium silicate (Wollostonite) are known as fillers. These fiber-shaped fillers are able to improve the tensile strength of the matrix unidirectionally along their orientation. However, they lower the tensile strength remarkably in the transverse direction. That is, they make the material anisotropic. Accordingly, these fillers decrease the impact strength of the polyvinyl chloride. Mica is generally known as a reinforcing material of a polymer which anisotropically affects the physical property of a polymer composite material. However, when mica which has a large ratio of length to thickness (i.e., a large aspect ratio) is blended with polyvinyl chloride, the impact strength of this polymer, as well as the tensile strength, is decreased significantly. This may result from the fact that a shearing stress to disperse the mica in polyvinyl chloride incidentally breaks lamellar crystals of the mica, and lowers the tensile strength of the polymer. When this occurs, the portion of the mica which has crystals left unbroken causes further deterioration of the impact strength. Also, the addition of talc prompts the polymer to degradate upon heating, stains it black in the molding process, and further results in spoiling the impact strength.

Generally, it is known that the addition of an inorganic filler hastens the degradation of polyvinyl chloride. The reason for this is believed to be that the iron ion accelerates the removal of hydrogen chloride from polyvinyl chloride. The asbestos-polyvinyl chloride composite material (widely used in the form of a tile) has been studied to improve the thermal stability. According to "The Handbook of the Additives for Plastics and Rubbers" (published by Kagaku Kogyo-sha, 1970), it has been disclosed that dicyanandiamides and melamine are useful in increasing the thermal stability of polyvinyl chloride. However, when only one portion of a dicyandiamide is added to 100 parts of a talc-polyvinyl chloride compound, the thermal stability is decreased. Similarly, adding one part of melamine causes almost no increase in thermal stability. Also, stabilizers such as tribasic lead sulfate or butyl tin maleate do not increase thermal stability of polyvinyl chloride.

SUMMARY OF THE INVENTION

The present inventors have made an intensive study to improve the impact strength and thermal stability during processing of a talc-polyvinyl composite material. The inventors have discovered that the impact strength, tensile strength and bending strength can be anisotropically improved by reinforcing polyvinyl chloride with an amount of talc. The talc must contain 85% or more by weight, and preferably 90% or more, of particles having a diameter of less than 10 microns. Furthermore, the inventors have found that thermal stability can be greatly improved by blending an amount of polyamide having a softening or melting point of less than 200° C. and/or amide compound into the compound. The amide compound has the formula:

$$R_1CONHR_2$$

wherein $R_2$ is not hydrogen.

Accordingly, it is a primary object of the present invention to present a polyvinyl chloride composite material comprising polyvinyl chloride and talc wherein 85% by weight of said talc has a particle size (stoke's diameter) of not more than 10 microns.

Another object of the invention is to present such a polyvinyl chloride composite material having an improved impact strength.

Still another object of the present invention is to provide a polyvinyl chloride composite material having an improved thermal stability.

Yet another object of the present invention is to present a polyvinyl chloride composite material comprising polyvinyl chloride and talc wherein 85% by weight of said talc has a particle size of not more than 10 microns, this composite material further comprising not less than 0.1 parts by weight of a polyamide having a softening point of less than 200° C. per 100 parts by weight of said talc.

These and other objects and advantages of the present invention will become apparent to those of ordinary skill in the art upon reading the details of composition and use of the disclosed material as is more fully set forth below. Reference is made to the accompanying Tables forming a part thereof.

DESCRIPTION OF THE PREFERRED EMBODIMENTS

Prior to describing the present polyvinyl chloride composite materials specifically, it is to be understood that this invention is not to be limited to the particular components and proportions disclosed as such materials may, of course, vary. Also, it is to be understood that the terminology utilized herein is for descriptive purposes relative to particular embodiments, and is not intended to be limiting since the scope of the present invention will be limited only by the appended claims.

The talc employed in this invention is one of the minerals with the monoclinic system. The chemical formula is $Mg_2(Si_4O_{10})(OH)_2$, and is ground when used. To carry out the grinding, a jaw crusher, hammer crusher or impact mill may be used. However, a crusher-like impact mill is most suitable for the present invention. Some crushers which are useful are Supermicron Mill (manufactured by Hosokawa Iron Works), Mikro Atomizer, Raymond Vertical Mill and Ultracontraplex Mühle.

When talc from China is ground by a Supermicron Mill, the powdery talc may be obtained in the following particle distribution:
10 microns and below 74.7%
5 microns and below 59.7%
The polyvinyl chloride (DP 1000, lead-compounded) is incorporated with this powdered talc to make a pellet, when is then formed into a belt which is 3 mm thick × 60 mm wide. The tensile strength and impact strength of the belt may be measured by means of a DuPont Impact Texter (with ⅜" striker) and the tensile strength may be measured by means of Tensilon(Toyo Baldwin) along both the machine direction (MD) and the transversal direction (TD). The impact strength, reduced to 300 g, is indicated as height (cm) when half of the specimens are broken. When talc is present in amounts between 5 and 30 percent by weight, the talc-blended polyvinyl chloride has an almost similar tensile strength as the pure polyvinyl chloride and the isotropy of the mechanical property becomes small, whereas the DuPont impact strength is lowered in the talc-blended polyvinyl chloride when it is compared with pure polyvinyl chloride. Talc made from this invention should be comprised of 85%, and preferably 90%, of particles having a diameter of 10 microns or less. Thus, the talc utilized should have 10% or less of particles having a diameter of 10 microns or more when quantified by a particle distribution measuring apparatus using centrifugal sedimentation.

In order to crush the talc below 10 microns in size, an impact mill type crusher and a classifier of the Archimedes spiral air type are used in tandem. Mikroplex (RT) of Alpine Co., Ltd. is known as the classifier of this type. When the classifier is operated, fine adjustment of the blade angles are needed. Once the blades set, the classifying operation must be repeated. In addition, a zig-zag type classifier in which classifying chamber walls rotate (manufactured by Alpine Co., Ltd.) may also be used. Sometimes, an easily crushable talc may be properly crushed without use of a classifier, or it may be crushed using cyclon to remove the more coarse particles.

If the circumstances require, the talc may be treated with a silane coupling agent, an organic titanate or a fatty acid.

The amount of the talc to be blended with the polyvinyl chloride is not particularly limited. However, it is preferable to use from 5 to 40 percent by weight of the composite.

Polyvinyl chloride, as used in this invention, is intended to mean a polymer, a copolymer or a modified polymer thereof, being composed of a predominant amount of polyvinyl chloride. Accordingly, the "polyvinyl chloride" may contain polyvinyl chloride, polyvinylidene chloride, copolymer of vinyl chloride and vinylidene chloride, vinyl chloride and vinyl acetate, vinyl chloride and anhydrous maleic acid, vinyl chloride and ethylene, or vinyl chloride and propylene, and a modified resin, such as chlorinated polyvinyl chloride. These resinous materials may be used singly or in combination with each other. Moreover, such resins as ABS, MBS and chlorinated polyethylene which have been used to improve the impact strength may be mixed according to the particular circumstance. In these cases, polyvinyl chloride content is not less than 40% by weight of the total amount of the composite. Furthermore, additives such as a lead-, a tin-, a Ca-Zn-containing stabilizer, a lubricant and an agent for improving processability may be added if necessary. Occasionally, other fillers such as calcium carbonate, gypsum, gypsum fibers, asbestos, mica, calcium silicate or fiberglass may be used in combination. The composite material shows still more improved propertes when it contains from 0.1 to 30 parts by weight of polyamide and/or amide compound per 100 parts by weight of talc used.

The polyamide, specified in this invention as having a softening or a melting point of approximately 200° C. and below, comprises a linear polymer with the —CONH— unit which proves to have a softening point of 200° C. and below by the "falling ball method" defined in ASTME-28-58T, or to have a melting point of 200° C. and below by the DSC method, wherein the main peak is considered to show the melting point. Therefore, familiar polyamides, such as nylon 6, nylon 6,6, nylon 11 and nylon 12 are not suitable for use in this invention because they are highly crystalline and have the softening temperatures higher than that specified in this invention.

In order to lower the softening or the melting point of such polyamides, it is necessary to lower the amount of crystallization. Among the polymers of which crystalinity are lowered are copolymers built up from polymer components (such as nylon 6, nylon 6,6, nylon 6,10 and nylon 12), nylons modified through alkoxy methylation (such as methoxy methylated nylon 6, methoxy methylated nylon 6,6), and some particular kinds of polyamides. The polyamides can be produced by polymerizing ethylene diamine and the dimer synthesized from an unsaturated aliphatic acid. In addition to these polymers, there may be involved some polyamides modified with an unsaturated aliphatic acid or phenol.

However, it must be noted that free amine or stabilizers for polyamides are sometimes uneffective or even harmful with regard to thermal stability of the polyvinyl chloride.

The polyamide may be blended by any of the following processes: adding the polyamide to vinyl chloride at the start of polymerization; adding the polyamide to the talc-containing polyvinyl chloride; or adding to the polyvinyl chloride the mixture of talc and polyamide blended with heat. When a polyamide of the solvent-soluble type is used, the surface of the talc particle may be treated previously. The proportion of the polyamide to the talc is approximately from 0.1 to 30% by weight, in preference not more than 25% by weight. That is, when the proportion is above 25 or below 0.1% by weight, the effect on the thermal stability becomes inadequate.

The amount of the talc is not particularly limited in this invention. In general, only a small amount of the talc deteriorates the thermal stability of polyvinyl chloride. However, the talc of this invention significantly increases the thermal stability of the polyvinyl chloride. When the talc is used in a large quantity, the correspondent effect can be anticipated. But when the quantity of the talc exceeds 40% by weight, molding of the polyvinyl chloride composite material becomes difficult and the physical properties tend to be lost. Therefore, it is recommended that the talc is used in an amount not exceeding 40% by weight based on the total weight of the present composite.

In order to obtain products with high impact strength, it is desirable to use talc containing 85% or more of its particles having a diameter of 10 microns or less. The talc-containing polyvinyl chloride not prepared in accordance with this invention is generally liable to cause deterioration of thermal stability. Also, the impact strength decreases in proportion to the prolongation of the talc-blending time. On the contrary, in this invention, adding the polyamide minimizes undesirable results and brings out the favorable effect of the talc.

The amide compound $R_1CONHR_2$, where $R_2$ is not a hydrogen atom, is used in this invention. It is preferred that the amide be an amide derivative of an aliphatic compound, such as alkylene bis-amide, like aliphatic ethylene bis-amide ($R_2$:$CH_2CH_2NHCOR_4$), or aliphatic methylene bis-amide ($R_2$:$CHNHCOR_3$), or methylolated aliphatic amide ($R_2$:$CH_2OH$). In these cases $R_2$ is showm by the formula $(CH_2)_nNHCOR_5$ when n is an integer usually of from 1 to 10. In these compounds, $R_1$, $R_3$, $R_4$ and $R_5$ are each aliphatic hydrocarbons containing 10 or more, usually not more than 40, carbon atoms. When the amide compound $R_1CONHR_2$ is added to the polyvinyl chloride containing the talc, the decrease in impact strength is minimized. When the talc is blended with the polyvinyl chloride, the dispersion increases as the blending time increases. On the contrary, the impact strength, as well as thermal stability, decreases. Also, impact strength falls much more when a large mixer is used to blend the talc than when a small mixer is used. More specifically, when a 100-liter mixer is used for blending, the impact strength of the polyvinyl chloride compound turns out to be approximately ⅔ of the impact strength when a 20-liter mixer is used for the same span of time. The difference appears to be caused by heat evolved from the friction between the agitator's blades and the inner surface of the mixer. In short, the larger the mixer, the greater the peripheral speed of the blade, which gives rise to much more heat and which causes deterioration of the polymer's properties. The same result occurs when the blending time is prolonged. The amide compound of the present invention contributes an excellent effect in preventing deterioration of the thermal stability. The amount of the amide should be determined in order that the total lubricity of the polyvinyl chloride compound may be adjusted for the mixer to be used, since the amide has a slight lubricity. Generally, the preferred amount of amide is 0.5 to 20 parts by weight and, preferably, not more than 10 parts by weight per 100 parts by weight of the talc. Alkylene bis-aliphatic amide may be used singly, since the thermal stability is improved. However, in the case of methylolated aliphatic amide, the thermal stability is not significantly enhanced. Accordingly, the polyamide of this invention or alkylene bis-aliphatic amide should be used in combination. Naturally, both the polyamide and alkylene bis-aliphatic amide can be applied together. The method of mixing the amide with the other components may be selected from the following: (1) the amide may be mixed at the start of the polyvinyl chloride polymerization, (2) the amide may be mixed into the mixture of the talc and the polyvinyl chloride, or (3) the amide may be added to the talc with heat before making up the polyvinyl chloride compound.

The talc used must be composed of 85% or more of particles which have a diameter of 10 microns or less. The impact strength is significantly influenced by the distribution of particles having diameters of less than 10 microns. The method of mixing the talc, the polymide or the amide with the polyvinyl chloride is not particularly important to this invention. However, it is desirable that the talc be previously well dispersed in the polyvinyl chloride. To insure good dispersion of the talc, preliminary mixing by means of Banbury mixer or high speed mixing for about 20 minutes (this may vary according to the type of mixer used) should be considered. In molding the polyvinyl chloride compound, the extruder of double roll type, uniaxial type, biaxial type or special complex type can be used without modifications. It should be noted that a double roll, a uniaxial, a biaxial, a special complex type extruder or a Banbury mixer may also be used first in pelletizing, then an injection, a blowing, an extrusion or a calender molding apparatus may be used in molding.

Conventionally, no talc has been incorporated with polyvinyl chloride. It has been blended with polystyrene or polyolefins. One of the reasons for this is that impact strength is very much decreased when talc is added, thus preventing it from being put into practical use. Since talc has a lamellar crystal form different from other fillers, such as calcium carbonate, it has been considered that the stress concentrates on the crystal edge, thus causing a decrease in the impact strength of a matrix. However, since this invention has improved the impact strength of the polyvinyl chloride composite material by a very simple method, such as using the talc having a particular particle distribution, the industrial need for this invention will be significant.

This invention has made it possible to enhance the thermal stability of polyvinyl chloride by adding the amide compound. The discovery that this amide had this particular ability was difficult, since the amide is substantially neither a stabilizer nor a lubricant. This achievement provides even more advantages when coupled with the synergistic effect of the amide and the talc.

By incorporating the amide, the present invention has prevented the decrease of impact strength of the polyvinyl chloride compound, which occurred in the polymer when the talc was mixed with the polymer and other additives, such as a stabilizer or a lubricant. Accordingly, the inventors of the present invention have succeeded in enhancing the reliability of the product through the improvement of the mechanical properties.

Specific embodiments of the present invention will be disclosed and set forth in the following Examples.

EXAMPLE 1

Talc from China is crushed by means of Supermicron Mill, the powdery talc including the particles of $10\mu$ or less comprising 74.7% of the powder, and particles of $5\mu$ or less comprising 59.7% of the powder being obtained. This talc was passed through a 325 mesh (JIS) sieve. The following talc specimens were prepared using Mikroplex classifier (manufactured by Alpine Co., Ltd. and Yasukawa Electric Mfg. Co., Ltd.):
(1) $10\mu\leq$: 85.7%, $5\mu\leq$: 66.9%
(2) $10\mu\leq$: 90.4%, $5\mu\leq$: 81.1%
(3) $10\mu\leq$: 95.2%, $5\mu\leq$: 88.3%
To the polyvinyl chloride mixed with lead (tradename: Kanevinyl S-1001, a product of Kanegafuchi Chemical Industry Co., Ltd.) was added the talc specimens in the amounts of 5, 10, 20 and 30% by weight, respectively. After blending at a temperature below 80° C. for 20 minutes by means of a Supermixer, the blended materials were pelletized at 180° C. using a 40 mm diameter extruder (manufactured by Tabata Co., Ltd., Type: HV-40-28, Dullmage Screw CR=3.2, 2.2). The pellets were shaped into a belt with a 3 mm thickness and 60 mm width using the same extruder.

The tensile strength was measured along the machine direction at a constant speed of 10 mm/min. using a No. 1 test piece of a JIS K-7113. The tensile strength along the transversal direction was also measured at a constant speed of 5 mm/min. using a No. 3 test piece of a JIS K-7113. The impact strength was measured by a DuPont Impact Tester with a ⅜" striker. The result, reduced to 300 g, was indicated as height (cm) when half of the specimens were broken. The measurements were all carried out at 23° C. Table 2 shows the result.

None of the talc specimens lowered the tensile strength. The anisotropy of the mechanical property was small. In the case of the talc (1), the impact strength and tensile strength along the MD were significantly improved. Moreover, talc (2) proved to be effective in increasing impact strength of the polyvinyl chloride compound to a point approximately as high as that of pure polyvinyl chloride. The particle distribution of every talc specimen was quantified using a Shimazu particle distribution measuring apparatus of the centrifugal sedimentation type CF-50. The solvent used was water (with 0.2% $(NaPO_2)_6$ as a dispersing agent) and the dispersion temperature was 29° C. The particle size of the present invention thus measured is defined as Stoke's diameter. The particle distribution of each talc specimen is detailed in Table 1.

TABLE 1

|  | $10\mu \geqq$: 74.7% (original) | $10\mu \geqq$: 85.7% (talc 1) | $10\mu \geqq$: 90.4% (talc 2) | $10\mu \geqq$: 95.2% (talc 3) |
|---|---|---|---|---|
| $10\mu \leqq$ | 25.3 | 14.3 | 9.6 | 4.8 |
| 10–8μ | 5.3 | 5.6 | 3.6 | 3.1 |
| 8–6μ | 6.2 | 8.7 | 3.9 | 2.1 |
| 6–5μ | 3.5 | 4.5 | 1.8 | 1.7 |
| 5–4μ | 5.4 | 6.8 | 3.6 | 3.0 |
| 4–3μ | 6.4 | 7.8 | 3.7 | 4.8 |
| 3–2μ | 12.8 | 11.3 | 13.3 | 9.8 |
| 2–1μ | 13.1 | 19.7 | 28.8 | 26.9 |
| 1–0.8μ | 3.9 | 3.6 | 5.8 | 8.5 |
| 0.8–0.7μ | 2.2 | 1.6 | 2.4 | 4.4 |
| $0.7\mu \geqq$ | 15.9 | 16.0 | 21.5 | 30.9 |

EXAMPLES 2–9, COMPARATIVE EXAMPLES 2–9

The lead-blended compound (hereinafter to be referred to as the "base compound") was prepared using a Supermixer heated to 100° C. by mixing 100 parts of polyvinyl chloride (Kanevinyl S-1001), 3.0 parts of tribasic lead sulfate, 1.5 parts of dibasic lead stearate, 0.5 part of lead stearate, 0.5 part of calcium stearate, and 2.0 parts of PA-20 (produced by Kanegafuchi Chemical Industry Co., Ltd.).

| | |
|---|---|
| Amilan CM-8000 (Toray) m.p. 123° C. | Ex. 2 |
| Versalon 1200 (Nihon General Mills) s.p. 200° C. | Ex. 3 |
| Versalon 1164 (Nihon General Mills) s.p. 160° C. | Ex. 4 |
| Versalon 1117 (Nihon General Mills) s.p. 117° C. | Ex. 5 |
| Versalon 1300 (Nihon General Mills) s.p. 95° C. | Ex. 6 |
| Milvex 1000 (Nihon General Mills) s.p. 135° C. | Ex. 7 |
| Milvex 1235 (Nihon General Mills) s.p. 200° C. | Ex. 8 |
| Amilan CM-8000 AA[20]* m.p. ca 120° C. | Ex. 9 |

*Acrylic acid-grafted Amilan product, which is prepared by adding ammonium cerium (VI) sulfate to the solution mixture containing CM-8000 powder, 2N—$H_2SO_4$, and 20 parts of acrylic acid.

The thermal stability was measured by means of the kneader-typed plastograph (manufactured by Bravender Co., Ltd.). FIG. 1 shows a typical pastograph and Table 3 shows the maximum torque ($M_B$), the retaining time of the steady torque ($\Delta T_1$) and the time from the appearance of the maximum torque to the start of the decomposition ($\Delta T_2$).

The condition of the plastograph measurement was as follows: Capacity of the chamber—55 ml; Temperature—190° C.; Amount of the tested specimen—72 g; Preheating time—4 minutes; Rotor revolution—40 rpm.

In determining $\Delta T_1$ and $\Delta T_2$ (Tc) and Tc are first settled. These points are fixed on the curve of the plastograph by 0.1 kg-m higher than the minimum torque. When $T_B$ is assumed as the time of the maximum torque appearance, then $\Delta T_1$ is equal to (Tc−(Tc)), and $\Delta T_2$ is equal to (Tc−$T_B$).

In order to compare the effects of the foregoing polyamides with those of the following substances, comparative examples were carried out as to the following compounds:

| | |
|---|---|
| Base compound | Comp. Ex. 2 |
| 80 parts base compound + 20 parts talc (2) | Comp. Ex. 3 |
| 79 parts base compound + 20 parts talc (2) + 1 part tribasic lead sulfate | Comp. Ex. 4 |
| 79 parts base compound + 20 parts talc (2) + 1 part butyl tin maleate | Comp. Ex. 5 |
| 79 parts base compound + 20 parts talc (2) + 1 part urea | Comp. Ex. 6 |

TABLE 2

| | | Blending Proportion of Talc % | Tensile Property along the MD | | | Tensile Property along the TD | | | DuPont Impact Strength reduced to 300g (measured with a ⅜″ striker) H50 cm |
|---|---|---|---|---|---|---|---|---|---|
| | | | Strength kg/cm² | Resilience kg/cm² | Elongation % | Strength kg/cm² | Resilience kg/cm² | Elongation | |
| Example | 10 | 5 | 560 | 15300 | >100 | 541 | 14300 | >100 | >200 |
| | 85.7% | 10 | 571 | 17800 | >100 | 548 | 16600 | >100 | 190 |
| | (talc 1) | 20 | 574 | 21900 | 28 | 550 | 19300 | 24 | 68 |
| | | 30 | 583 | 26700 | 16 | 551 | 24700 | 13 | 28 |
| | 10 | 5 | 567 | 15400 | >100 | 533 | 14200 | >100 | >200 |
| | 90.4% | 10 | 579 | 18100 | >100 | 544 | 16700 | >100 | >200 |
| | (talc 2) | 20 | 581 | 21200 | 37 | 546 | 19500 | 35 | 98 |
| | | 30 | 580 | 26300 | 20 | 545 | 24200 | 21 | 56 |
| | 10 | 5 | 569 | 15000 | >100 | 541 | 14100 | >100 | >200 |
| | 95.2% | 10 | 576 | 17700 | >100 | 552 | 16600 | >100 | >200 |
| | (talc 3) | 20 | 579 | 22700 | 40 | 554 | 20100 | 40 | 142 |
| | | 30 | 578 | 26100 | 25 | 549 | 24900 | 26 | 67 |
| Comparative | PVC | 0 | 542 | 11500 | >100 | 534 | 10500 | >100 | >200 |
| Example | 10 | 5 | 545 | 14800 | 98 | 518 | 13900 | 86 | 90 |
| | 74.7% | 10 | 557 | 17400 | 94 | 529 | 16400 | 82 | 69 |
| | (original) | 20 | 574 | 20900 | 14 | 545 | 19600 | 13 | 39 |
| | | 30 | 568 | 25800 | 5 | 540 | 24300 | 4 | 17 |

The compound specimens composed of 79 parts of the base compound, 20 parts of the talc (2) in Example 1, and 1 part of the following polyamides were prepared:

| | |
|---|---|
| 79 parts base compound + 20 parts talc (2) + 1 part dicyandiamide | Comp. Ex. 7 |
| 79 parts base compound + 20 parts talc (2) + 1 part melamine | Comp. Ex. 8 |

-continued 79 parts base compound + 20 parts talc (2)
+ 1 part nylon 6,6          Comp. Ex. 9

TABLE 3

|  | $M_B$ (kg-m) | $\Delta T_1$ (min) | $\Delta T_2$ (min) |
|---|---|---|---|
| Example 2 | 5.7 | 10.5 | 18.5 |
| 3 | 5.2 | 7.7 | 13.8 |
| 4 | 6.6 | 7.0 | 13.6 |
| 5 | 5.6 | 6.0 | 11.5 |
| 6 | 6.1 | 8.3 | 14.4 |
| 7 | 6.5 | 9.5 | 16.6 |
| 8 | 4.6 | 8.3 | 15.1 |
| 9 | 5.3 | 10.0 | 22.7 |
| Comparative Example 2 | 6.2 | 22.7 | 29.8 |
| 3 | 5.5 | 3.2 | 7.9 |
| 4 | 5.4 | 3.5 | 8.1 |
| 5 | 4.9 | 4.5 | 7.6 |
| 6 | 5.1 | 1.4 | 2.8 |
| 7 | 5.5 | 4.5 | 4.0 |
| 8 | 6.0 | 5.2 | 9.2 |
| 9 | 5.0 | 4.2 | 8.1 |

When Comparative Example 2 is compared with Comparative Example 3 as to $\Delta T_1$ and $\Delta T_2$, the thermal stability of the base compound is shown to have increased approximately 1/9 in $\Delta T_1$ and approximately ¼ in $\Delta T_2$ by adding the talc of this invention. However, neither tribasic lead sulfate nor butyl tin maleate has a significant effect on further improving the thermal stability (see Comparative Examples 4 and 5). Urea, dicyandiamide or melamine (which is said to be effective in enhancing the thermal stability of the asbestos-polyvinyl chloride composite material) also has almost no effect in this case. Moreover, in some specimens the result is negative. Accordingly, it becomes apparent that any conventional additives are not available for improving the thermal stability (See Comparative Examples 6 and 8). However, the polyamide of this invention can increase thermal stability 2.2 to 2.7 times in $\Delta T_1$ and 1.7 to 2.9 times in $\Delta T_2$ (See Examples 2-9).

Nylon 6,6 (having the higher melting point than that specified in this invention) has, of course, no effect on thermal stability. This shows that it is necessary to use the polyamides with a melting point not higher than 200° C.

EXAMPLES 10-15

The base compound, the talc (2) and Amilan CM-8000 used in Example 2, were mixed in the following proportions, and the thermal stability of each specimen was evaluated by means of the plastograph apparatus. The results are shown in Table 4.

| Base Compound (parts) | Talc (parts) | Amilan CM-8000 (parts) | |
|---|---|---|---|
| 79.9 + | 20 + | 0.1 | Ex. 10 |
| 79.7 + | 20 + | 0.2 | Ex. 11 |
| 79.5 + | 20 + | 0.5 | Ex. 12 |
| 79.0 + | 20 + | 1.0 | Ex. 13 |
| 78.0 + | 20 + | 2.0 | Ex. 14 |
| 75.0 + | 20 + | 5.0 | Ex. 15 |

TABLE 4

|  | $M_B$ (kg-m) | $\Delta T_1$ (min) | $\Delta T_2$ (min) |
|---|---|---|---|
| Example 10 | 5.5 | 9.5 | 15.9 |
| 11 | 5.5 | 12.5 | 19.3 |
| 12 | 6.5 | 12.4 | 19.0 |
| 13 | 5.7 | 10.5 | 18.5 |
| 14 | 6.0 | 8.0 | 16.6 |
| 15 | 7.4 | 4.5 | 11.9 |
| Comparative Example 3 | 5.5 | 3.2 | 7.9 |

The ratio of Amilan CM-8000 to the talc was 0.5, 1.0, 2.5, 5.0, 10.0 and 2.50% by weight, respectively. The thermal stability was significantly improved by adding only 0.5% by weight of Amilan CM-8000 (based upon the weight of the talc) to the polyvinyl chloride compound. The thermal stability attains a maximum between 1.5 and 2.5% by weight of Amilan CM-8000 and then gradually lowers. However, the stabilized property is still maintained higher in the specimen containing 25% by weight Amilan than in the specimen of Comparative Example 3. The maximum torque, however, remains constant or even tends to lower when the polyamide of this invention is added. Accordingly, it can be concluded that the thermal stability is substantially unaffected by the increased lubricity caused by adding the polyamide.

EXAMPLES 16-19; COMPARATIVE EXAMPLES 10-13

To investigate the quantitative effect of the talc on thermal stability of the polyvinyl chloride compound, several compositions were prepared. The ratio of Amilan CM-8000 to the talc was made 2.5% by weight, and the compositions were subjected to plastography. The result is shown in Table 5.

| Base Compound (parts) | Talc (parts) | Amilan CM-8000 (part) | |
|---|---|---|---|
| 94.875 | 5 | 0.125 | Ex. 16 |
| 89.750 | 10 | 0.250 | Ex. 17 |
| 84.625 | 15 | 0.325 | Ex. 18 |
| 79.500 | 20 | 0.500 | Ex. 12 |
| 69.250 | 30 | 0.750 | Ex. 19 |
| 95 | 5 | 0 | Comp. Ex. 10 |
| 90 | 10 | 0 | Comp. Ex. 11 |
| 85 | 15 | 0 | Comp. Ex. 12 |
| 70 | 30 | 0 | Comp. Ex. 13 |

TABLE 5

|  | $M_B$ (kg) | $T_1$ (min) | $T_2$ (min) |
|---|---|---|---|
| Example 16 | 5.3 | 17.5 | 23.6 |
| 17 | 5.4 | 22.0 | 28.0 |
| 18 | 6.0 | 16.0 | 23.4 |
| 12 | 6.5 | 12.4 | 19.0 |
| 19 | 5.9 | 7.5 | 13.9 |
| Comparative Example 2 | 6.2 | 22.7 | 29.8 |
| 10 | 5.4 | 7.7 | 13.2 |
| 11 | 4.9 | 7.3 | 11.9 |
| 12 | 4.8 | 5.8 | 9.6 |
| 3 | 5.5 | 3.2 | 7.9 |
| 13 | 5.3 | 2.4 | 5.1 |

When the talc is added to the base compound in the amount of 5% by weight, $T_1$ and $T_2$ are significantly lowered. This lowering trend continues until the amount of the talc added is 30% by weight. However, the thermal stability in terms of $T_1$ and $T_2$ is remarkably improved by adding a polyamide of this invention to the talc-blended compound. The polyamide effect is clearly present when talc has been incorporated in amounts as high as 30% by weight. However, the effect is most remarkable when the amount of the talc is below 10% by weight. The thermal stability of the talc-blended polyvinyl chloride is increased so that it almost equals that of the base compound.

EXAMPLES 20-31; COMPARATIVE EXAMPLES 14-19

The mixtures composed of 79 parts of the base compound in Example 2, 20 parts of the talc (2) in Example 1, and 1 part of the following amide compounds were blended by a mixer for 20, 30 and 40 minutes. To evaluate the thermal stability of the polyvinyl chloride compound, $\Delta T_1$ and $\Delta T_2$ were determined in the same way as described in Example 2. The polyvinyl chloride compound was shaped into a belt in the manner described in Example 1. The impact strength was measured by the height (cm) at which one-half of the specimens break. The measurements were made by means of the DuPont Impact Tester.

| Amide Compounds Incorporated | | |
| --- | --- | --- |
| Methylolated Stearamide: | | |
| $(CH_3(CH_2)_{16}CONH.CH_2OH$ | 20 min. mixing | Ex. 20 |
| | 30 min. mixing | Ex. 21 |
| | 40 min. mixing | Ex. 22 |
| Methylene bis-stearamide: | | |
| $CH_2(-NHCO\ C_{17}H_{35})_2$ | 20 min. mixing | Ex. 23 |
| | 30 min. mixing | Ex. 24 |
| | 40 min. mixing | Ex. 25 |
| Ethylene bis-stearamide: | | |
| $(-NHCO\ C_{17}H_{35})CH_2.CH_2(-NHCO\ C_{17}H_{35})$ | 20 min. mixing | Ex. 26 |
| | 30 min. mixing | Ex. 27 |
| | 40 min. mixing | Ex. 28 |
| Ethylene bis-oleamide: | | |
| $(-NHCO\ C_{17}H_{33})CH_2.CH_2(-NHCO\ C_{17}H_{33})$ | 20 min. mixing | Ex. 29 |
| | 30 min. mixing | Ex. 30 |
| | 40 min. mixing | Ex. 31 |

For the purpose of comparison, the following compositions without the amide compound were prepared by varying the mixing time, or adding 1 part of tribasic lead sulfate:

| Base Compound (parts) | Talc (parts) | Tribasic Lead Sulfate (part) | Mixing Time (min) | |
| --- | --- | --- | --- | --- |
| 80 | 20 | 0 | 20 | Ex. 14 |
| 80 | 20 | 0 | 30 | Ex. 15 |
| 80 | 20 | 0 | 40 | Comp. Ex. 16 |
| 79 | 20 | 1.0 | 20 | Comp. Ex. 17 |
| 79 | 20 | 1.0 | 30 | Comp. Ex. 18 |
| 79 | 20 | 1.0 | 40 | Comp. Ex. 19 |

In Comparative Examples 14–19, $\Delta T_1$, $\Delta T_2$ and the DuPont impact strength rapidly decrease as the mixing time is prolonged. When the mixing time is as much as 40 minutes, both specimens of Comparative Examples 16 and 19 are stained black. This is caused by the polyvinyl chloride decomposition. However, when the amide compound is added according to this invention, the impact strength is increased much more in the 30-minute mixed specimens than in the 20-minute mixed specimens, and is retained after 40 minutes of mixing.

TABLE 6

| | $\Delta T_1$(min) | $\Delta T_2$(min) | DuPont (cm) |
| --- | --- | --- | --- |
| Example 20 | 7.8 | 11.7 | 112 |
| 21 | 7.7 | 11.5 | 134 |
| 22 | 7.7 | 11.3 | 103 |
| 23 | 9.2 | 13.8 | 108 |
| 24 | 9.2 | 13.7 | 127 |
| 25 | 9.0 | 13.9 | 111 |
| 26 | 9.8 | 14.6 | 122 |
| 27 | 10.1 | 13.9 | 141 |
| 28 | 9.7 | 13.7 | 120 |
| 29 | 12.5 | 18.0 | 118 |
| 30 | 11.7 | 18.5 | 136 |
| 31 | 11.3 | 17.6 | 115 |
| Comparative Example 14 | 3.2 | 7.9 | 98 |
| 15 | 2.2 | 5.7 | 54 |
| 16 | 1.3 | 3.2 | 35 |
| 17 | 3.5 | 8.1 | 97 |
| 18 | 2.1 | 5.6 | 52 |
| 19 | 1.3 | 3.3 | 33 |

The retention of $\Delta T_1$ and $\Delta T_2$, as well as the fact that the compound is not stained, can be attributed to the prevention of the decomposition of polyvinyl chloride (said decomposition being accelerated by the talc) because of the presence of the amide. The effect seems to be due to the fact that the $R_2$ in the amide compound takes the form of methylol ($-CH_2OH$) or $-CH_2NH-COR_1$ and $-CH_2CH_2NHCOR_1$, with which an alkylene bis-aliphatic amide forms.

The reason that the impact strength reaches a maximum after 30 minutes of mixing may be due to the offset effect caused between the decomposition of the polymer and the talc dispersion. The mixing causes decomposition of the polymer, which decreases the impact strength. However, the mixing increases the talc dispersion, which increases the impact strength. The effect is to neutralize each other after approximately 30 minutes of mixing. However, in the case of the Comparative Examples, in which the correspondent peak of the impact strength appears at 20 minutes, the decomposition of the polymer may no longer be hindered, while the dispersion of the talc may still remain inadequate at about 20 minutes so that the impact strength will begin to fall.

EXAMPLES 32-46

With the base compound in Example 2, the talc (2) in Example 1, ethylene bis-stearamide (EBS) in Example 26, and Amilan CM-8000 in Example 2, the following compounds were prepared by varying the mixing time. As for the compounds prepared, $\Delta T_1$, $\Delta T_2$ and the DuPont impact strength were evaluated in the same manner as described in Example 20. The result is shown in Table 7.

| Base Compound (parts) | Talc (parts) | EBS (parts) | Mixing Time (min) | |
| --- | --- | --- | --- | --- |
| 79.9 | 20 | 0.1 | 20 | Ex. 32 |
| 79.9 | 20 | 0.1 | 30 | Ex. 33 |
| 79.9 | 20 | 0.1 | 40 | Ex. 34 |

-continued

| | | | | |
|---|---|---|---|---|
| 79.7 | 20 | 0.3 | 20 | Ex. 35 |
| 79.7 | 20 | 0.3 | 30 | Ex. 36 |
| 79.7 | 20 | 0.3 | 40 | Ex. 37 |
| 79.5 | 20 | 0.5 | 20 | Ex. 38 |
| 79.5 | 20 | 0.5 | 30 | Ex. 39 |
| 79.5 | 20 | 0.5 | 40 | Ex. 40 |
| 78.0 | 20 | 2.0 | 20 | Ex. 41 |
| 78.0 | 20 | 2.0 | 30 | Ex. 42 |
| 78.0 | 20 | 2.0 | 40 | Ex. 43 |

| Base Compound (parts) | Talc (parts) | Amilan CM-8000 (part) | EBS (parts) | Mixing Time (min) | |
|---|---|---|---|---|---|
| 79.4 | 20 | 0.1 | 0.5 | 20 | Ex. 44 |
| 79.4 | 20 | 0.1 | 0.5 | 30 | Ex. 45 |
| 79.4 | 20 | 0.1 | 0.5 | 40 | Ex. 46 |

The DuPont strength, and $\Delta T_1$, $\Delta T_2$, are prevented from decreasing by the addition of 0.1 part of EBS (0.5 part based on the weight of the talc). The DuPont impact strength is lowered due to the over-lubricity of the compound and insufficient gelation when the EBS content reaches 2.0 parts. However, the effect of the mixing time cannot be found, so the effect of the EBS seems to be present. The amide compound disclosed herein ($R_1CONHR_2$) has a lubricity.

TABLE 7

| Example No. | | EBS (parts) | Mixing Time (min) | $\Delta T_1$ | $\Delta T_2$ | DuPont Impact Strength |
|---|---|---|---|---|---|---|
| 32 | | 0.1 | 20 | 5.8 | 11.0 | 116 |
| 33 | | 0.1 | 30 | 5.6 | 10.2 | 121 |
| 34 | | 0.1 | 40 | 5.0 | 9.3 | 96 |
| 35 | | 0.3 | 20 | 6.0 | 11.0 | 123 |
| 36 | | 0.3 | 30 | 5.7 | 10.6 | 125 |
| 37 | | 0.3 | 40 | 5.4 | 10.3 | 109 |
| 38 | | 0.5 | 20 | 7.3 | 11.3 | 120 |
| 39 | | 0.5 | 30 | 7.2 | 11.1 | 137 |
| 40 | | 0.5 | 40 | 7.0 | 10.9 | 121 |
| 26 | | 1.0 | 20 | 9.8 | 14.6 | 122 |
| 27 | | 1.0 | 30 | 10.1 | 13.9 | 141 |
| 28 | | 1.0 | 40 | 9.7 | 13.7 | 120 |
| 41 | | 2.0 | 20 | 11.8 | 15.8 | 78 |
| 42 | | 2.0 | 30 | 12.0 | 14.9 | 79 |
| 43 | | 2.0 | 40 | 11.7 | 15.6 | 78 |
| 44 | CM-8000 + | 0.5 | 20 | 12.5 | 19.3 | 129 |
| 45 | " | 0.5 | 30 | 12.6 | 19.7 | 148 |
| 46 | " | 0.5 | 40 | 12.4 | 19.4 | 127 |

Therefore, the lubricity of the composite material must be decreased in order to prevent excessive lubrication. This is done by subtracting the amount of other lubricating agents which added when the amide is added.

Amilan CM-8000, the polyamide of this invention, and EBS display a favorable effect in combination. They prevent the DuPont impact strength from decreasing and increase $\Delta T_1$ and $\Delta T_2$ without being affected by prolongation of the mixing time. Accordingly, the thermal stability is improved without changing the degree of gelation of the composite material.

The present invention is shown and described herein in what is believed to be the most practical, and the preferred, embodiments. It is, however, recognized that departures may be made from this disclosure which is within the scope of the invention and that obvious modifications will occur to persons of ordinary skill in the art.

What is claimed is:

1. A polyvinyl chloride composite material comprising polyvinyl chloride and talc, wherein 85 percent by weight or more of said talc has a particle size of not more than 10 microns and said composite material contains a member, in an amount of from 0.1 to 30 parts by weight per 100 parts by weight of said talc, selected from the group consisting of an amide compound of the formula $R^1CONHR^2$, wherein $R_1$ is an aliphatic hydrocarbon and $R^2$ is an aliphatic moiety, and a polyamide having a softening point or a melting point of not higher than 200° C.

2. A polyvinyl chloride composite material as in claim 1 wherein said talc comprises 5 to 40 percent by weight of said material.

3. A polyvinyl chloride composite material as in claim 1 wherein said material comprises from 0.5 to 20 parts by weight of said amide per 100 parts by weight of said talc used.

4. A polyvinyl chloride composite material as in claim 1 wherein said material comprises from 0.1 to 25 parts by weight of said polyamide per 100 parts by weight of said talc used.

5. A polyvinyl chloride composite material as in claim 1 wherein $R^2$ is shown by the formula, $(CH_2)_nNHCOR^5$ where $R^5$ is an aliphatic hydrocarbon containing from 10 to 40 carbon atoms and n is an integer of from 1 to 10.

6. A polyvinyl composite material comprising polyvinyl chloride and talc, wherein 85 percent or more of said talc has a particle size of not more than 10 microns, said composite material further comprising a member in an amount which improves the thermostability of said composite material and selected from the group consisting of an amide compound of the formula $R^1CONHR^2$, wherein $R^1$ is an aliphatic hydrocarbon and $R^2$ is an aliphatic moiety, and a polyamide which has a softening point or a melting point of not higher than 200° C.

* * * * *